(12) United States Patent
Ohshima

(10) Patent No.: US 8,606,075 B2
(45) Date of Patent: Dec. 10, 2013

(54) IMAGE PROCESSING APPARATUS, IMAGE PROCESSING METHOD, AND PROGRAM

(75) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/312,010

(22) Filed: Dec. 6, 2011

(65) Prior Publication Data

US 2012/0155826 A1 Jun. 21, 2012

(30) Foreign Application Priority Data

Dec. 15, 2010 (JP) ................................ 2010-279702

(51) Int. Cl.
 *H04N 5/765* (2006.01)

(52) U.S. Cl.
 USPC ............ 386/232; 386/230; 386/225; 386/224

(58) Field of Classification Search
 USPC .................................. 386/232, 230, 225, 224
 See application file for complete search history.

(56) References Cited

U.S. PATENT DOCUMENTS

| | | | | |
|---|---|---|---|---|
| 6,752,802 | B1 * | 6/2004 | Isenberg et al. | 606/28 |
| 6,901,403 | B1 * | 5/2005 | Bata et al. | 1/1 |
| 8,238,689 | B2 * | 8/2012 | Inoue | 382/274 |
| 8,466,967 | B2 * | 6/2013 | Shintani | 348/207.1 |
| 2005/0141848 | A1 * | 6/2005 | Deguchi et al. | 386/1 |
| 2006/0007485 | A1 * | 1/2006 | Miyazaki | 358/1.15 |
| 2006/0221208 | A1 * | 10/2006 | Minami | 348/231.2 |
| 2006/0279636 | A1 * | 12/2006 | Sasaki | 348/207.2 |
| 2009/0185051 | A1 * | 7/2009 | Sano | 348/231.2 |
| 2009/0276465 | A1 * | 11/2009 | Namba et al. | 707/200 |
| 2010/0103287 | A1 * | 4/2010 | Oikawa | 348/231.99 |

FOREIGN PATENT DOCUMENTS

| | | |
|---|---|---|
| JP | 2008-005254 A | 1/2008 |
| JP | 2009-037452 A | 2/2009 |

* cited by examiner

*Primary Examiner* — Helen Shibru
(74) *Attorney, Agent, or Firm* — Canon U.S.A., Inc. IP Division

(57) ABSTRACT

A communication apparatus notifies existence of content data in a recording medium of an image processing apparatus to an external apparatus according to a request from the external apparatus. When the content data in the recording medium includes the content data having a first format, the communication apparatus notifies existence of the content data having the second format corresponding to the content data having the first format.

19 Claims, 5 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program which are suitably used particularly to transmit image data.

2. Description of the Related Art

In recent years, guidelines for mutually sharing digital contents such as still images, moving images, and audios among devices of different manufacturers have been defined in digital living network alliance (DLNA) (registered trademark) and the guidelines have been widespread. Among the devices complying with a DLNA guideline, a digital content is transferred between a digital media server (DMS) providing the digital content and a digital media player (DMP) displaying the digital content. The DMP can display the digital content provided from the DMS.

For example, Japanese Patent Application Laid-Open No. 2008-5254 discusses a in which first, a device determines whether the device itself can convert a format of a content from reproduction condition information or the other server can convert the format. Only information of a content of which a format can be converted is opened. Furthermore, when a content of which a format must be converted is requested, the format is converted and transmitted. Japanese Patent Application Laid-Open No. 2009-37452 discusses a technique in which first, content data are classified while maintaining a hierarchical structure to reduce a resource used when a content data list is opened on a network. The list is opened so that the number of the content data is equal to or less than a prescribed number according to the classification.

However, the technique discussed in Japanese Patent Application Laid-Open No. 2008-5254 determines and converts the format on the side providing the content. For this reason, even when the technique can convert the format into a plurality of patterns, the technique does not open a kind of the format capable of being converted. The user side cannot select desired conversion. Further, the technique discussed in Japanese Patent Application Laid-Open No. 2009-37452 does not correspond to a case where a content which cannot be displayed exists.

SUMMARY OF THE INVENTION

According to an aspect of the present invention, an apparatus includes a conversion unit configured to convert first content data having a first format into second content data having a second format, a notification unit configured to notify existence of content data in a recording medium of the apparatus to an external apparatus according to a request from the external apparatus. When the content data in the recording medium includes the first content data, the notification unit notifies existence of the second content data corresponding to the first content data even when the first content data is not converted into the second content data. Furthermore, the notification unit notifies existence of a plurality of content data, each of which corresponds to the first content data and is converted into the second format under different conditions respectively. The transmission unit is configured, when the external apparatus requests any of the plurality of content data having the second format, to transmit the second content data converted under a condition according to the request to the external apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
FIG. 1 illustrates a network configuration example of a digital camera and an external display apparatus.

FIG. 1 illustrates a network configuration example of a digital camera 100 and an external display apparatus 101 according to the present exemplary embodiment. In FIG. 1, the digital camera 100 is a server providing a content. The external display apparatus 101 displays the content. The digital camera 100 and the external display apparatus 101 are connected to each other via a network.

Figure 4:
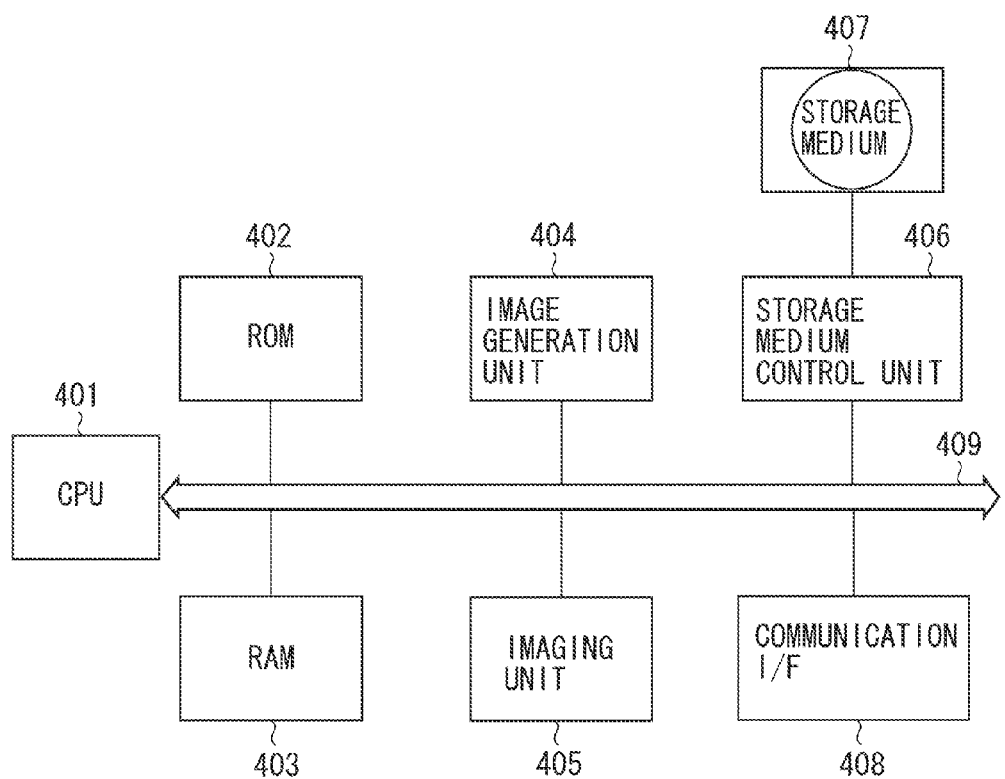
FIG. 4 is a block diagram illustrating a configuration example of a digital camera according to an exemplary embodiment.

FIG. 4 is a block diagram illustrating a configuration example of the digital camera 100 according to the present exemplary embodiment. In FIG. 4, the digital camera 100 includes a central processing unit (CPU) 401, a read-only memory (ROM) 402, a random access memory (RAM) 403, an image generation unit 404, an imaging unit 405, a storage medium control unit 406, and a communication interface (I/F) 408, each of which is connected to a system bus 409.

The CPU 401 executes a control program stored in the ROM 402, to control the entire digital camera 100. The ROM 402 is a nonvolatile memory storing the control program. The RAM 403 is a volatile memory used as a work area when the CPU 401 executes the control program. The RAM 403 is used also as an area temporarily buffering image data generated by imaging before the image data is stored in a storage medium 407.

The image generation unit 404 performs image generation processing such as Joint Photographic Experts Group (JPEG) coding or Motion Picture Experts Group (MPEG) coding for a digital electric signal generated by the imaging unit 405 and stored in the RAM 403, to generate image data. Further, when executing editing of image processing of some kind or another for the image data stored in the storage medium 407, the image generation unit 404 performs image generation processing.

The imaging unit 405 includes an optical lens, a charge-coupled¥ device (CCD), and an analog/digital (A/D) converter. The imaging unit 405 converts light entered through the optical lens into a digital electric signal, and stores the digital electric signal in the RAM 403. The storage medium control unit 406 controls the storage medium 407. The storage medium 407 stores the image data. Examples of the storage medium 407 include compact flash® and a hard disk. The communication I/F 408 is an interface for performing communication with the external display apparatus 101. Examples of the communication I/F 408 include a wireless local area network (LAN), Ethernet®, and Bluetooth®.

Figure 5:
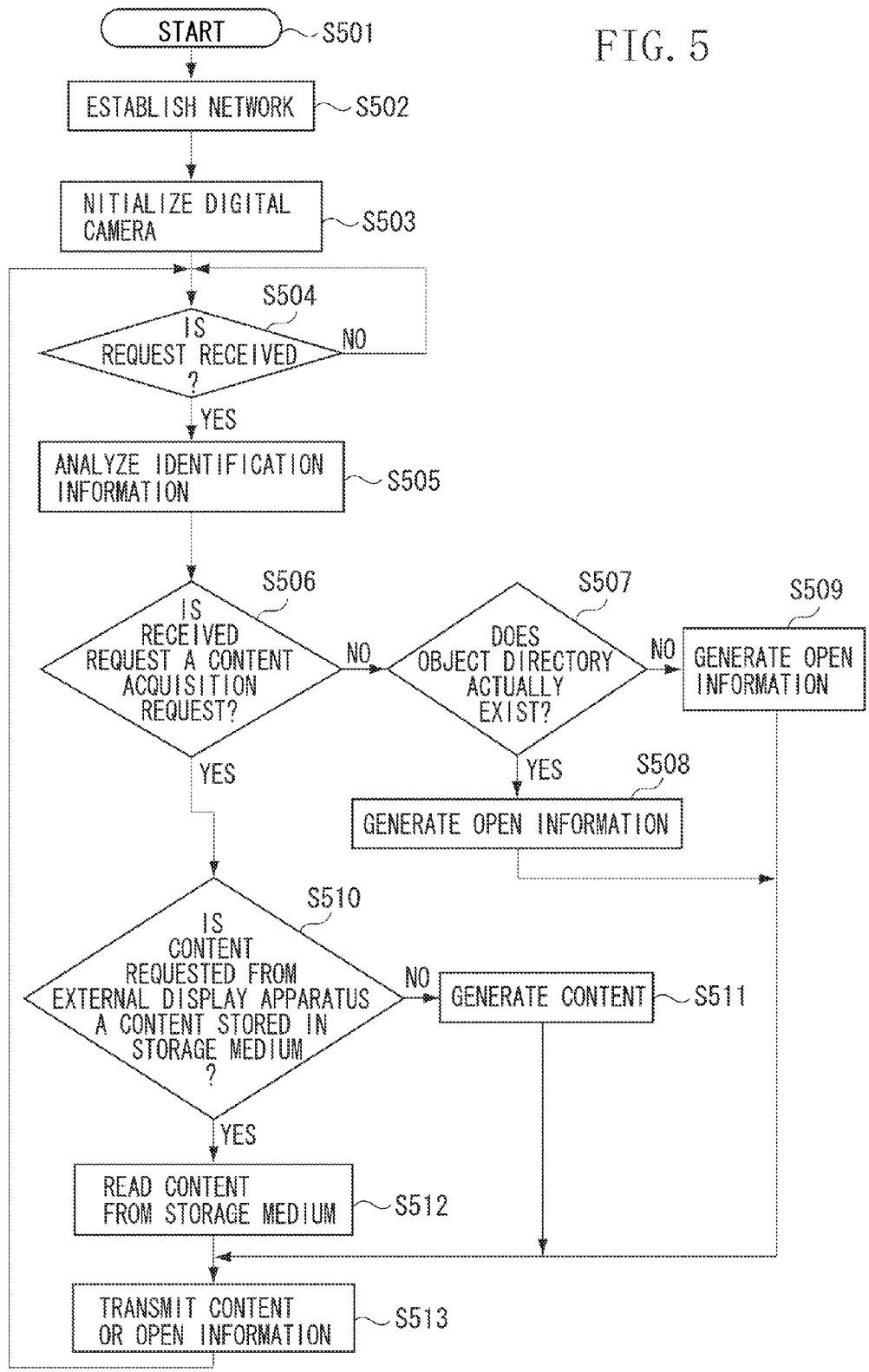
FIG. 5 is a flow chart illustrating an example of a procedure for transmitting information to the external display apparatus.

A flow of processing for providing a content will be described. FIG. 5 is a flow chart illustrating an example of a processing procedure until the CPU 401 transmits content information opened to the external display apparatus 101. In addition, each processing illustrated in FIG. 5 is performed by controlling of the CPU 401.

First, in step S501, a user instructs communication with a network, the CPU 401 starts processing. In step S502, the CPU 401 establishes the network using the communication I/F 408. In addition, when establishing the network, the digital camera 100 must set necessary items such as its own IP address. After setting the necessary items, the CPU 401 must previously establish a network configuration for the digital camera 100 based on a protocol such as Transmission Control Protocol/Internet Protocol (TCP/IP). When the CPU 401 establishes the communication, the CPU 401 causes the processing to proceed to step S503.

Next, in step S503, the CPU 401 initializes the digital camera 100 as a content providing server. In the present exemplary embodiment, the CPU 401 operates the digital camera 100 as a DMS. After the CPU 401 completes the initialization, the CPU 401 causes the processing to proceed to step S504. In step S504, the CPU 401 stands by until the CPU 401 receives any request from the external display apparatus 101 via the communication I/F 408. When the CPU 401 receives the request (YES in step S504), the CPU 401 causes the processing to proceed to step S505.

Next, in step S505, the CPU 401 analyzes identification information included in the request from the external display apparatus 101. For example, when a Uniform Resource Locator (URL) is used as the identification information, the URL is generated so that the URL can one-to-one correspond to each directory and content when information is provided. After the CPU 401 analyzes the identification information, the CPU 401 causes the processing to proceed to step S506.

Next, in step S506, the CPU 401 determines whether the received request is a content acquisition request as a result of analyzing the identification information in step S505. When the request is the content acquisition request as a result of the determination (YES in step S506), the CPU 401 causes the processing to proceed to step S510. When the request is not the content acquisition request but an information acquisition request in a directory (NO in step S506), the CPU 401 causes the processing to proceed to step S507.

In Step s507, the CPU 401 determines whether a target directory of the information acquisition request actually exists in the storage medium 407. When the object directory actually exists as a result of the determination (YES in step S507), the CPU 401 causes the processing to proceed to step S508. When the object directory does not exist (NO in step S507), the CPU 401 causes the processing to proceed to step S509.

In step S508, the CPU 401 generates open information (list information) in the corresponding directory in the storage medium 407 for the information acquisition request of the external display apparatus 101. Herein, the open information includes at least a URL which is the identification information. The CPU 401 generates the open information so that each URL one-to-one corresponds to a directory or a content. When the CPU 401 generates the open information, the CPU 401 causes the processing to proceed to step S513.

On the other hand, in step S509, the CPU 401 generates open information obtained by associating a parameter capable of performing image processing with a file corresponding to the requested directory. When the CPU 401 generates the open information, the CPU 401 causes the processing to proceed to step S513.

In step S510, the CPU 401 determines whether the content requested from the external display apparatus 101 is a content stored in the storage medium 407 or a content on which image processing must be performed, from the analysis result of the identification information. When the requested content is the content stored in the storage medium 407 as a result of the determination (YES in step S510), the CPU 401 causes the processing to proceed to step S512. When the requested content is the content on which image processing must be performed (NO in step S510), the CPU 401 causes the processing to proceed to step S511.

In step S511, the CPU 401 reads a corresponding content for the content requested by the storage medium control unit 406, from the storage medium 407. The image generation unit 404 performs image processing, to generate a content to be transmitted. The CPU 401 causes the processing to proceed to step S513. On the other hand, in step S512, the CPU 401 reads the content requested from the external display apparatus 101 from the storage medium 407. The CPU 401 causes the processing to proceed to step S513.

Next, in step S513, the CPU 401 transmits the content or the open information to the external display apparatus 101 via the communication I/F 408. After the CPU 401 completes the transmission, the CPU 401 causes the processing to proceed to step S504 to prepare for the next request from the external display apparatus 101.

Figure 2:
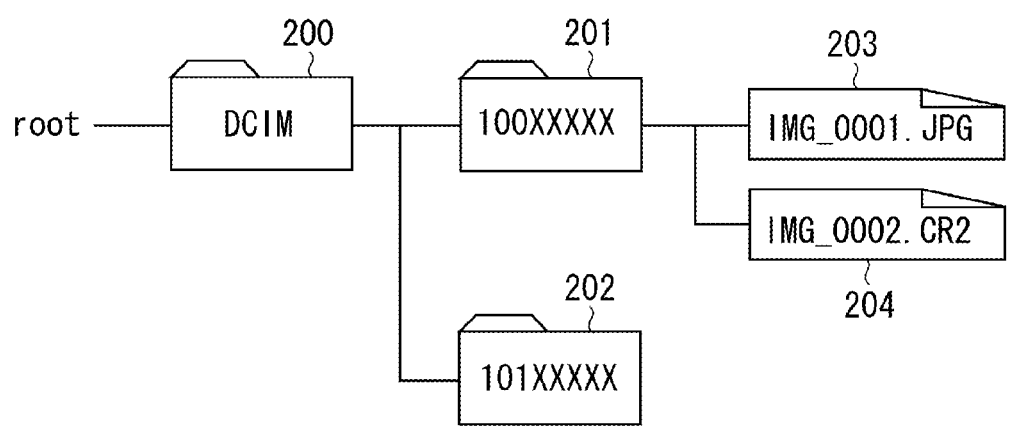
FIG. 2 illustrates a directory configuration example of a storage medium.

Next, the processing illustrated in FIG. 5 will be described using a specific directory as an example. FIG. 2 illustrates a directory configuration example of the storage medium 407 of the digital camera 100 in the present exemplary embodiment.

In FIG. 2, a Digital Camera IMages (DCIM) directory 200 exists in a root of the storage medium 407. The directory includes a "100XXXXX" directory 201 and a "101XXXXX" directory 202. Furthermore, the "100XXXXX" directory 201 shall include an "IMG__0001. JPG" file 203 which is JPEG image data, and an "IMG__0002. CR2" file 204 which is RAW image data.

Figure 3:
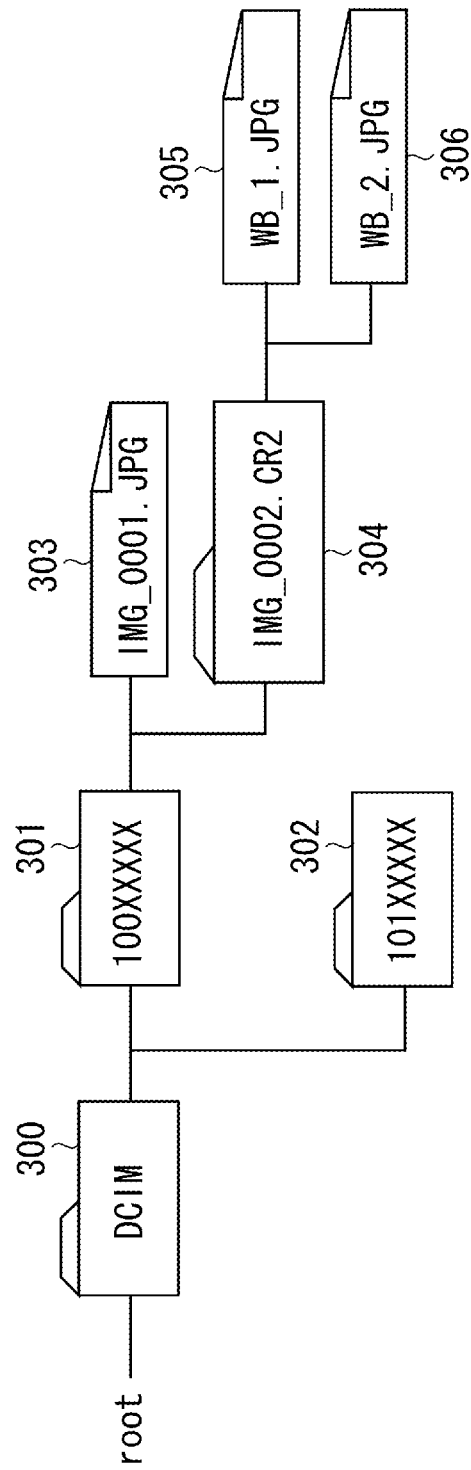
FIG. 3 illustrates a configuration example of open information in an exemplary embodiment.

FIG. 3 illustrates a configuration example of the open information in the present exemplary embodiment. FIG. 3 is an example for a case of an inner configuration of the storage medium 407 illustrated in FIG. 2. Hereinafter, a processing procedure for various requests received from the external display apparatus 101 will be specifically described.

An acquisition request of information below the root will be described. When acquisition of the information below the root is requested from the external display apparatus 101, the information is transmitted to the external display apparatus 101 by the following procedure.

Step S504: The CPU 401 receives the request from the external display apparatus 101.

Step S505: The CPU 401 analyzes the identification information.

Step S506: The CPU 401 determines that the received request is the acquisition request of the information in the root, and causes the processing to proceed to step S507.

Step S507: Since the root exists in the storage medium 407, the CPU 401 causes the processing to proceed to step S508.

Step S508: Since only the DCIM directory 200 exists in the root, the CPU 401 generates a DCIM directory 300 as the open information. In this case, the identification information included in the open information is configured to one-to-one correspond to the DCIM directory 300.

Step S513: The digital camera 100 transmits the open information on the DCIM directory 300 to the external display apparatus 101.

An acquisition request of information of the DCIM directory 300 will be described. A DCIM directory is opened to the external display apparatus 101, and is displayed on the external display apparatus 101. When the DCIM directory is specified by a user operation of the external display apparatus 101, the acquisition request of the information of the DCIM directory 300 is transmitted to the digital camera 100. When the acquisition of the information of the DCIM directory 300 is requested from the external display apparatus 101, the information is transmitted to the external display apparatus 101 by the following procedure.

Step S504: The CPU 401 receives the request.
Step S505: The CPU 401 analyzes the identification information.
Step S506: The CPU 401 determines that the received request is the acquisition request of the information in the DCIM directory 300, and causes the processing to proceed to step S507.
Step S507: Since the DCIM directory 200 exists in the storage medium 407, the CPU 401 causes the processing to proceed to step S508.
Step S508: Herein, the directories to be targets of the open information are the "100XXXXX" directory 201 and the "101XXXXX" directory 202 existing in the DCIM directory 200. Then, the CPU 401 generates a "100XXXXX" directory 301 and a "101XXXXX" directory 302 as the open information. The identification information included in the open information is configured to one-to-one correspond to each directory.
Step S513: The digital camera 100 transmits the open information on the "100XXXXX" directory 301 and the "101XXXXX" directory 302 to the external display apparatus 101.

An acquisition request of information of the "100XXXXX" directory 301 will be described. The "100XXXXX" directory 301 and the "101XXXXX" directory 302 are opened to the external display apparatus 101, and are displayed on the external display apparatus 101. When the "100XXXXX" directory 301 or the "101XXXXX" directory 302 is specified by a user operation of the external display apparatus 101, an acquisition request of information of the specified directory is transmitted to the digital camera 100. When the acquisition of the information of the "100XXXXX" directory 301 is requested from the external display apparatus 101, the information is transmitted to the external display apparatus 101 by the following procedure.

Step S504: The CPU 401 receives the request.
Step S505: The CPU 401 analyzes the identification information.
Step S506: The CPU 401 determines that the received request is the acquisition request of the information in the "100XXXXX" directory 301, and causes the processing to proceed to step S507.
Step S507: Since the "100XXXXX" directory 201 exists in the storage medium 407, the CPU 401 causes the processing to proceed to step S508.
Step S508: Contents to be targets of open information in the "100XXXXX" directory 201 are an "IMG_0001. JPG" file 203 and an "IMG_0002. CR2" file 204. Herein, since the "IMG_0001. JPG" file 203 can be displayed on the external display apparatus 101, the open information is generated as an "IMG_0001. JPG" file 303 as it is. On the other hand, since the "IMG_0002. CR2" file 204 is a content which cannot be displayed on the external display apparatus 101, the open information is generated as an "IMG_0002. CR2" directory 304. In the present exemplary embodiment, the "IMG_0002. CR2" directory 304 is generated as the directory for the "IMG_0002. CR2" file 204. However, the directory name may be anything.

Step S513: The digital camera 100 transmits the open information for the "IMG_0001. JPG" file 303 and the "IMG_0002. CR2" directory 304 to the external display apparatus 101.

An acquisition request of the "IMG_0001. JPG" file 303 will be described. The "IMG_0001. JPG" file 303 and the "IMG_0002. CR2" directory 304 are opened to the external display apparatus 101, and are displayed on the external display apparatus 101. When the "IMG_0001. JPG" file 303 or the "IMG_0002. CR2" directory 304 is specified by a user operation of the external display apparatus 101, an acquisition request of information of the specified file or directory is transmitted to the digital camera 100. When the acquisition of the "IMG_0001. JPG" file 303 is requested from the external display apparatus 101, a content is transmitted to the external display apparatus 101 by the following procedure.

Step S504: The CPU 401 receives the request.
Step S505: The CPU 401 analyzes the identification information.
Step S506: The CPU 401 determines that the received request is the acquisition request of the "IMG_0001. JPG" file 303, and causes the processing to proceed to step S510.
Step S510: Since the content requested from the external display apparatus is a content stored in the storage medium 407 as a result of the analysis of the identification information, the CPU 401 causes the processing to proceed to step S512.
Step S512: The CPU 401 reads the "IMG_0001. JPG" file 203 from the storage medium 407.
Step S513: The digital camera 100 transmits the "IMG_0001. JPG" file 203 to the external display apparatus 101.

An acquisition request of information of the "IMG_0002. CR2" directory 304 will be described. When the information acquisition of the "IMG_0002. CR2" directory 304 is requested from the external display apparatus 101, the information is transmitted to external display apparatus 101 by the following procedure.

Step S504: The CPU 401 receives the request.
Step S505: The CPU 401 analyzes the identification information.
Step S506: The CPU 401 determines that the received request is the information acquisition request in the "IMG_0002. CR2" directory 304, and causes the processing to proceed to step S507.
Step S507: Since the "IMG_0002. CR2" directory 304 does not exist in the storage medium 407, the CPU 401 causes the processing to proceed to step S509.
Step S509: Image processing is performed on the "IMG_0002. CR2" file 204, to generate the open information as a "WB_1. JPG" file 305 and a "WB_2. JPG" file 306. Herein, the "WB_1. JPG" file 305 is JPEG image data obtained by performing white balance processing on the "IMG_0002. CR2" file 204 which is the RAW image data using, for example, a fluorescent lamp. Similarly, the "WB_2. JPG" file 306 is JPEG image data obtained by performing white balance processing on the "IMG_0002. CR2" file 204 using, for example, sunlight. In addition, the correspondence thereof may be anything. The file is made to one-to-one correspond to the URL which is the identification information included in the open information.

Although the lists obtained by different white balance processings are used as an example in the present exemplary embodiment, a JPEG image on which development processing is performed using other parameter may be used as the open information. Although the open information is the content in the present exemplary embodiment, the open information may be generated as a directory for each parameter, and a content or directory obtained by combining the parameters.

Step S513: The digital camera 100 transmits the open information on the "WB_1. JPG" file 305 and the "WB_2. JPG" file 306 to the external display apparatus 101.

An acquisition request of the "WB_1 . JPG" file 305 will be described. The "WB_1. JPG" file 305 and the "WB_2. JPG" file 306 are opened to the external display apparatus 101, and are displayed on the external display apparatus 101. When the "WB_1. JPG" file 305 or the "WB_2. JPG" file 306 is specified by a user operation of the external display apparatus 101, an acquisition request of information of the specified file is transmitted to the digital camera 100. When the acquisition of the "WB_1. JPG" file 305 is requested from the external display apparatus 101, a content is transmitted to the external display apparatus 101 by the following procedure.

Step S504: The CPU 401 receives the request.

Step S505: The CPU 401 analyzes the URL which is the identification information.

Step S506: The CPU 401 determines that the received request is the acquisition request of the "WB_1. JPG" file 305, and causes the processing to proceed to step S510.

Step S510: Since the content requested from the external display apparatus is not a content stored in the storage medium 407 as a result of the analysis of the identification information, the CPU 401 causes the processing to proceed to step S511.

Step S511 : The CPU 401 determines that the acquisition request is a request for performing development processing on the "IMG_0002. CR2" file 204 as a result of the analysis of the identification information. For example, when an operation for performing white balance processing using a fluorescent lamp is associated with content information as the open information, the "IMG_0002. CR2" file 204 is read from the storage medium 407. The image generation unit 404 performs the white balance processing using the fluorescent lamp, to generate the content. Thus, the image generation unit 404 generates the content according to a processing operation associated with the identification information added to the open information. A development processing timing may be a timing at which the acquisition request of the content is received from the external display apparatus 101, and may be previously produced before opening the content.

Step S513: The CPU 401 transmits the "WB_1. JPG" file 305 to the external display apparatus 101.

In the present exemplary embodiment, the directory configuration of the storage medium 407 of the digital camera 100 and the directory configuration opened as the open information are not made to completely agree with each other, and in the open information the content which cannot be displayed on the external display apparatus 101 is used as the directory. Furthermore, the configuration below the directory may be opened as the different directory depending on the parameters performing the image processing. The configuration may be opened as the content for each parameter value with one parameter fixed. In other words, the directory corresponding to the content which cannot be displayed on the external display apparatus 101 maybe generated, and the configuration below the directory may be a combined configuration of a plurality of directories and a plurality of contents.

In the present exemplary embodiment, the RAW image data as the content which cannot be displayed and the white balance processing as the processing example are described as the examples. However, the form of the content and the kind of the processing are not limited thereto. On the other hand, for example, when the identification information included in the request received in step S504 includes the list information of the format which can be displayed on the external display apparatus 101, the format which is not included in the list information may be treated as the content which cannot be displayed. In the present exemplary embodiment, the acquisition request is transmitted based on the user operation for each hierarchy of the directory. However, the acquisition request may be automatically repeated until the acquisition request reaches the undermost layer content of the directory structure.

As described above, the present exemplary embodiment opens the content which cannot be displayed as the directory, and further provides the information of the content which cannot be displayed as the plurality of contents which can be displayed. This will enable the content, which cannot be displayed on the external display apparatus, to be displayed. Furthermore, the present exemplary embodiment can select from the plurality of contents, for example, obtained by combining the parameters of the different patterns and performing the image processing. Therefore, the content of the desired format for the user side can be provided.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-279702 filed Dec. 15, 2010, which is hereby incorporated by reference herein in its entirety.

What is claimed is:

1. An apparatus comprising:
a conversion unit configured to convert first content data having a first format into second content data having a second format;
a notification unit configured to notify existence of a content data in a recording medium of the apparatus to an external apparatus according to a request from the external apparatus, wherein, when the content data in the recording medium includes the first content data, the notify unit notifies existence of the second content data corresponding to the first content data even when the first content data is not converted into the second content data, and wherein the notification unit notifies existence of a plurality of content data, each of which corresponds to the first content data and is converted into the second format under different conditions respectively; and a transmission unit configured to, when the external apparatus requests at least one of the plurality of content data having the second format, transmit the second content data converted under a condition according to the request to the external apparatus.

2. The apparatus according to claim 1, wherein the notification unit notifies existence of the first content data as a folder, and notifies that the second content data corresponding to the first content data exists below the folder.

3. The apparatus according to claim 1, wherein the notification unit notifies the external apparatus of identification information of the content data.

4. The apparatus according to claim 3, wherein the identification information is a URL.

5. The apparatus according to claim 1,
wherein the first content data is RAW image data; and
wherein the conversion unit converts the RAW image data into JPEG image data.

6. The apparatus according to claim 1, wherein the notification unit notifies the existence of the plurality of content data, each of which corresponds to the first content data and is converted into the second format under different image processing conditions.

7. The apparatus according to claim 6, wherein the image processing condition is setting of white balance.

8. A method for controlling an apparatus, the method comprising:
converting first content data having a first format into second content data having a second format;
notifying existence of a content data in a recording medium of the apparatus to an external apparatus according to a request from the external apparatus;
notifying existence of the second content data corresponding to the first content data even when the first content data is not converted into the second content data when the content data in the recording medium includes the first content data;
notifying existence of a plurality of content data, each of which corresponds to the first content data and is converted into the second format under different conditions respectively; and
transmitting, when the external apparatus requests at least one of the plurality of content data having the second format, the second content data converted under a condition according to the request to the external apparatus.

9. The method according to claim 8, further comprising:
notifying existence of the first content data as a folder; and
notifying that the second content data corresponding to the first content data exists below the folder.

10. The method according to claim 8, further comprising notifying the external apparatus of identification information of the content data.

11. The method according to claim 10, wherein the identification information is a URL.

12. The method according to claim 8,
wherein the first content data is RAW image data; and
wherein the converting the first content data converts the RAW image data into JPEG image data.

13. The method according to claim 8, further comprising notifying the existence of the plurality of content data, each of which corresponds to the first content data and is converted into the second format under different image processing conditions.

14. A non-transitory computer-readable recording medium recording a program for causing a computer to function as the apparatus of claim 1.

15. The non-transitory computer-readable recording medium according to claim 14, wherein the notification unit notifies existence of the first content data as a folder, and notifies that the second content data corresponding to the first content data exists below the folder.

16. The non-transitory computer-readable recording medium according to claim 14, wherein the notification unit notifies the external apparatus of identification information of the content data.

17. The non-transitory computer-readable recording medium according to claim 16, wherein the identification information is a URL.

18. The non-transitory computer-readable recording medium according to claim 14,
wherein the first content data is RAW image data; and
wherein the conversion unit converts the RAW image data into JPEG image data.

19. The non-transitory computer-readable recording medium according to claim 14, wherein the notification unit notifies the existence of the plurality of content data, each of which corresponds to the first content data and is converted into the second format under different image processing conditions.

* * * * *